2,956,022

HIGH EXTREME PRESSURE GREASE COMPOSITIONS

Bruce W. Hotten, Orinda, Calif., assignor to California Research Corporation, San Francisco, Calif., a corporation of Delaware No Drawing. Filed Mar. 26, 1958, Ser. No. 723,960

19 Claims. (Cl. 252—33.6)

This invention pertains to grease compositions having high melting points, that is, high dropping points, and high extreme pressure characteristics.

As a consequence of the rapid increase in the severity of operating conditions within industry, there is becoming an ever greater demand for grease compositions which are effective for the lubrication of wearing surfaces at high temperatures and under extremely heavy loads, that is, under extreme pressures. Thus, the load carrying capacity demanded of metal wearing surfaces is constantly being increased with the ever advancing developments in the industrial fields, particularly those in the heavy industries.

Steel mill operations, particularly those which are used for the rolling of metals, require grease compositions having high melting points and high extreme pressure characteristics. One such operation in a steel mill involves the transformation of steel ingots into rods or sheets by passing the hot metal through roll mill assemblies for the purpose of reducing the cross-sectional area of the hot metal. The rolls through which the hot metal must pass are supported by bearings which are known in the industry as "roll-neck bearings." As is well known, it is an extremely expensive operation to shut down a mill for the replacement of such bearings, particularly where the bearings fail due to the failure of lubrication. Therefore, it is a prime requisite in roll mill operations that the lubricants withstand the effects of heavy duty service and provide proper lubrication at all times to prevent lubrication failures.

A primary factor to consider in the lubrication of anti-friction roll-neck bearings is the extreme load to which the roll-necks must be subjected when hot metals are passing through the rolls. As the pressures under which the roll-neck bearings operate increase, there is a proportionate increase in the temperatures of these bearings. Such high temperatures and extreme pressures often cause the breakdown of the prior art grease compositions; for example, those greases which are thickened with a metal soap of a fatty acid, e.g., calcium hydroxystearate.

E.P. agents (i.e., extreme pressure agents) which are usually used in grease compositions are corrosive to metal surfaces. These metal-corrosive E.P. agents include the phosphorus, sulfur and chlorine-containing additives, such as the esters of acids of phosphorus, sulfurized olefins, sulfurized aromatic compounds, chlorinated hydrocarbons, etc. In addition to the aforenamed E.P. agents, lead soaps (e.g., lead soap of castor oil) are used as E.P. additives.

Such E.P. agents are not only corrosive to metal wearing surfaces, they cause changes in the characteristics of grease compositions. For example, the E.P. additives cause changes in consistency, dropping points, bleeding characteristics, etc. of the greases. Also, although some E.P. additives assist grease compositions to pass required film strength tests immediately after the preparation of the greases, such additives actually cause a marked decrease in the film strength after relatively short periods of grease storage.

Therefore, it is a primary object of this invention to provide grease compositions characterized by a high melting point and high extreme pressure values, which grease compositions are relatively noncorrosive to metal working surfaces without loss of grease characteristics.

In accordance with this invention, it has been discovered that high melting point, high extreme pressure grease compositions are obtained by incorporating therein metal salts of mononuclear aromatic monocarboxylic acids. In particular, grease compositions having high melting points and having extreme pressure characteristics are obtained by incorporating metal salts of mononuclear aromatic monocarboxylic acids in grease compositions thickened with certain particular grease thickening agents; that is, grease compositions thickened with metal salts of terephthalamic acids.

In addition to being characterized as having high melting points and high extreme pressure characteristics, the grease compositions herein are extremely resistant to the detrimental effects of nuclear radiation. That is, the grease compositions of this invention can be subjected to radiations in the amount of $1 \times 10^8$ roentgens without suffering the usual effects of liquefaction as obtained by the irradiation of grease compositions. Furthermore, the grease compositions herein are resistant to emulsification in water. In particular, the grease compositions of this invention are characterized as having high melting points and extreme pressure properties, as being resistant to radiation, noncorrosive to metal wearing surfaces, and resistant to emulsification in water.

Although the grease compositions of this invention can be used for numerous purposes, such grease compositions are particularly useful in steel mill motors, steel mill transfer table bearings, steel mill roller bearings, paper mill roller bearings, nuclear reactors, automotive wheel bearings, bearings of amphibious military vehicles, high temperature cannery equipment, exposed control surface bearings for aircraft, etc.

The particular thickening agents of the grease compositions herein are metal salts of terephthalamic acids which are described in Hotten U.S. Patents 2,820,012 and 2,820,053. These terephalamic acid salts have the following formula:

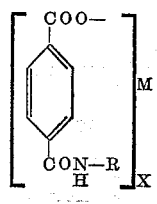

wherein R is an organo radical, that is, a straight-chain branched-chain, or cyclic, unsaturated or saturated hydrocarbon radical, M is a metal, and X is a number having a value equal to the valence of the metal M. As a straight-chain or branched-chain radical, R can contain from 1 to 22 carbon atoms, preferably from 4 to 22 carbon atoms. As a cyclic radical, R can contain from 6 to 28 carbon atoms. It is preferable that R is an aliphatic radical containing from 4 to 22 carbon atoms.

When R is a straight-chain or a branched-chain radical containing less than 4 carbon atoms, it is preferred to use a gel-transfer method in the preparation of a grease structure. That is, it is preferred that the grease fiber structure be first formed in a hydrocarbon solvent (e.g., toluene), after which the base oil is added and the solvent removed by distillation.

Examples of R include the following radicals: methyl, ethyl, propyl, n-butyl, tertiary-butyl, pentyl, 2-methylbutyl, hexyl, 2-methylpentyl, heptyl, isoheptyl, octyl, 2-ethylhexyl, isooctyl, decyl, decenyl, dodecyl, tetradecyl, hexadecyl, hexadecenyl, octadecyl, octadecenyl, methylphenyl, ethylphenyl, propylphenyl, butylphenyl, octylphenyl, decylphenyl, dodecylphenyl, tetradecylphenyl, hexadecylphenyl, octadecylphenyl, etc.

The metals which can be used in the formation of the salts of terephthalamic acid include the metals of Groups I, II, III and IV of Mendelyeev's Periodic Table, preferably metals of Groups I and II, such as alkali metals and alkaline earth metals. Particular metals include lithium, sodium, potassium, silver, magnesium, calcium, zinc, strontium, cadmium, barium, aluminum and lead. Because of the increased melting point and improved texture, it is particularly preferred to use alkali metals, e.g., lithium, and sodium. A preferred alkaline earth metal is barium. Greater work stability, coupled with higher dropping points, are obtained with the use of the sodium and the barium salts of terephthalamic acids in the formation of grease compositions.

Examples of metal salts of terephthalamic acids which can be used as thickening agents according to this invention include sodium N-methylterephthalamate, sodium N-ethylterephthalamate, sodium N-butylterephthalamate, sodium N-amylterephthalamate, sodium N-hexylterephthalamate, sodium N-octylterephthalamate, sodium N-tetradecylterephthalamate, sodium N-octadecylterephthalamate, sodium N-docosylterephthalamate, sodium N-phenylterephthalamate, sodium N-methylphenylterephthalamate, sodium N-hexylphenylterephthalamate, sodium N-decylphenylterephthalamate, sodium N-tetradecylphenylterephthalamate, potassium N-methylterephthalamate, potassium N-amylterephthalamate, potassium N-octylterephthalamate, potassium N-decylterephthalamate, potassium N-hexadecylterephthalamate, potassium N-octadecylterephthalamate, potassium N-docosylterephthalamate, barium di(N-methylterephthalamate), barium di(N-butylterephthalamate), barium di(N-octylterephthalamate), barium di(N-docosylterephthalamate), barium di(N-phenylterephthalamate), barium di(N-methylphenylterephthalamate), barium di(N-octylphenylterephthalamate), etc.

The metal salts of mononuclear aromatic monocarboxylic acids which are effective herein in combination with the metal salts of terephthalamic acids in the formation of high temperature E.P. grease compositions include the metal salts of mononuclear aromatic monocarboxylic acids and the mononuclear substituted aromatic monocarboxylic acids. Such metal salts of mononuclear aromatic monocarboxylic acids include the metal salts represented by the formula:

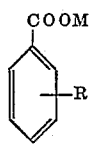

where M is a metal and R represents hydrogen, an aliphatic radical, halogen group, or a hydroxyl radical.

The metal "M" includes the metals of Groups I, II, III and IV of Mendelyeev's Periodic Table, particularly the metals of Groups I and II, such as the alkali metals and the alkaline earth metals, as represented by lithium, sodium, potassium, magnesium, calcium and barium. It is preferable that the metals herein be the same as those used in the formation of the metal salts of terephthalamic acids which are used to thicken the oil compositions in the formation of the greases. It is particularly preferred that the metals be sodium or barium.

When "R" is an aliphatic radical, it is preferred that "R" contains from 1 to 8 carbon atoms, more preferably, an aliphatic radical containing from 1 to 4 carbon atoms in a position para to the carboxyl radical. Although considerably less effective than the para isomers, the "R" radical may also be in the meta and ortho positions. Although not as effective as the aliphatic radical, the "R" group may be an inorganic group as exemplified by the hydroxyl group (i.e., —OH group), and the halogeno group (e.g., —Cl, —Br and —I).

Thus, the metal salts of mononuclear aromatic monocarboxylic acids which are effective herein, in combination with metal salts of terephthalamic acids, include the ortho, meta, and para-substituted metal salts of benzoic acids as exemplified by sodium benzoate, sodium p-toluate, sodium p-ethylbenzoate, sodium p-propylbenzoate, sodium p-chlorobenzoate sodium p-hydroxybenzoate, sodium m-toluate, sodium m-chlorobenzoate, sodium salicylate, sodium m-hydroxybenzoate, sodium m-bromo benzoate, sodium o-bromobenzoate, sodium p-iodobenzoate, sodium m-iodobenzoate, sodium o-iodobenzoate, calcium salicylate, calcium di(p-hydroxybenzoate), calcium di(p-toluate), calcium di(p-ethylbenzoate), calcium di(m-propylbenzoate), calcium di(p-propylbenzoate), calcium di(p-chlorobenzoate), barium di(m-chlorobenzoate), barium di(p-bromobenzoate), barium di(p-ethylbenzoate), barium di(p-propylbenzoate), barium di(p-toluate), etc.

The metal salts of terephthalamic acids are used in amounts sufficient to thicken lubricating oils to the consistency of a grease. In particular, the metal salts of terephthalamic acids can be used in amounts of 5% to 50%, preferably from 7% to 30%, by weight.

The metal salts of mononuclear monocarboxylic acids are used in amounts of 1% to 30% by weight, preferably from 5% to 25% by weight.

It was established by the use of X-ray diffraction pattern analyses that the grease compositions of this invention contain metal salts of terephthalamic acids and metal salts of mononuclear aromatic monocarboxylic acids in combination; that the metal salts of terephthalamic acids and the metal salts of mononuclear aromatic monocarboxylic acids are not present as complexes.

Lubricating oils which are suitable herein as base oils for the compositions of this invention include a wide variety of lubricating oils, such as naphthenic base, paraffin base, and mixed base, other hydrocarbon lubricants, e.g., lubricating oils derived from coal products, and synthetic oils, e.g., alkylene polymers (such as polymers of propylene, butylene, etc., and mixtures thereof), alkylene oxide-type polymers, dicarboxylic acid esters, liquid esters of acids of phosphorus, alkyl benzenes, polymers of silicon, polyphenyls (e.g., biphenyls and terphenyls), alkyl biphenyl ethers, etc. Synthetic oils of the alkylene oxide-type polymers which may be used include those exemplified by the alkylene oxide polymers (e.g., propyleneoxide polymers) and derivatives, including alkylene oxide polymers prepared by polymerizing the alkylene oxides, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol, etc.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate and di-N-hexyl fumarate polymer.

Synthetic oils of the alkyl benzene type include those which are prepared by alkylating benzene (e.g. dodecyl benzene, tetradecyl benzene, etc.).

Synthetic oils of the type of polymers of silicon include the liquid esters of silicon and the polysiloxanes, which include those exemplified by tetraethyl silicate, tetraisopropyl silicate, tetra(4-methyl-2-penta)silicate, poly(methyl)siloxane, poly(methylphenyl)siloxane, etc.

The above base oils may be used individually as such, or in various combinations, wherever miscible or wherever made so by the use of mutual solvents.

The metal salts of mononuclear aromatic monocarboxylic acids are used in certain proportions in combination thereof with the metal salts of terephthalamic acids to obtain the benefits described herein. The mol ratios of metal salts of benzoic acids (including derivatives thereof) to the metal salts of terephthalamic acids range from 0.1 to 20, preferably from 1 to 10. That is, the mol ratio of metal benzoates to metal terephthalamates has a value ranging from 0.1 to 20, preferably from 1 to 10.

The grease compostiions herein can be prepared by forming an oil solution of benzoic acid (or derivative thereof) and a monoester of a terephthalamic acid (e.g., monomethyl N-octadecylterephthalamate) followed by incorporating therein an aqueous solution of a metal oxide or hydroxide in an amount sufficient to neutralize the hydrogen ion on the carboxyl group of the benzoic acid and to saponify the terephthalamic acid ester. The whole mixture is heated to a temperature sufficient to disperse the mixture of metal terephthalamate and metal benzoate in the oil and to remove the water, after which the mixture is cooled to form the gel structure resulting in the grease. The resulting grease composition may be milled by forcing through a needle valve under pressure such as 5000 p.s.i., or through a Manton Gaulin homogenizer at pressures ranging from 700 p.s.i. to 4000 p.s.i. and higher, etc.

It is preferred that the grease compositions herein be prepared as follows:

An ester of terephthalamic acid (e.g., methyl N-octadecylterephthalamate) and benzoic acid, wherein the mol ratio of benzoic acid to terephthalamate is from 1:1 to 10:1, are added to an oil of lubricating viscosity and the whole mixture is heated to a temperature of 200° F. to 400° F. to disperse the components in the oil. After this mixture has been cooled to a temperature below 150° F., an amount of metal oxide (or hydroxide) sufficient to form neutral metal benzoate and metal terephthalamate (in aqueous solution or dispersion) is added to the oil mixture. The whole oil composition is then heated to a maximum temperature ranging from 300° F. to 400° F. for a time sufficient to form the desired metal salts and to remove the water of reaction and hydration. The liquid composition is then cooled to form the grease structure, after which the grease is milled.

Example 1 hereinbelow illustrates a preferred method of preparing the grease compositions of this invention.

EXAMPLE 1

A mixture of 47 grams (0.1 equivalent) methyl N-octadecylterephthalamate, 122 grams (1.0 equivalent) benzoic acid, and 658 grams of a California solvent refined naphthenic base oil having a viscosity of 1705 SSU at 100° F. was heated with agitation to a temperature of 250° F. to form a homogeneous solution, and slowly cooled to 140° F. to form a smooth, soft paste. An aqueous solution of 44.5 grams sodium hydroxide (1.1 equivalent) in 50 ml. of water was added to the above mixture, and the whole mixture was heated to a maximum temperature of 320° F. The composition was immediately pan cooled, followed by milling through a ¼" needle valve at a pressure of 4000 p.s.i. The ASTM worked penetration (i.e., the ASTM penetration after 60 strokes in the ASTM worker at 77° F.) was 271.

The data presented in Tables I, II, III and IV hereinbelow illustrate the effectiveness of the combination of the metal salts of terephthalamic acids and the metal salts of benzoic acids in the formation of radiation resistant grease compositions having high temperature and high E.P. characteristics. Tables I and II show the composition of the greases tested, and Tables III and IV show the properties of these greases.

Base oil "A" was the same as the base oil described in Example 1 hereinabove.

Base oil "B" was a poly(methylphenyl)siloxane.

Base oil "C" was a California solvent refined paraffinic base oil having a viscosity of 480 SSU at 100° F.

The E.P characteristics of the grease compositions of this invention were determined by a Falex test, which is described in "Journal of the Institute of Petroleum," vol. 32, April 1946. The test assembly consists of a steel rod inserted between two steel V-shaped bearing blocks. The assembly of bearing blocks and rod is immersed in the grease being tested. The rod is rotated and, as the rod rotates, progressively increasing pressure is applied upon the rod by the V-shaped bearing blocks until seizure occurs. The numerical figures which are presented hereinbelow in Table II for the Falex test are the recorded Falex values at which seizure occurred; that is, the load under which the particular lubricating compositions failed.

A rigorous water resistance test was developed whereby a ball of grease of 5 grams weight was immersed in boiling distilled water. The time in minutes noted in Table II hereinbelow is the time duration for the test, at which time there was no noticeable disintegration of the grease ball in the water. Thus, at the termination of the test, at 60+ minutes, the grease ball remained intact.

The "bearing life" for a particular grease composition was determined by the following test procedure which is known as the Army-Navy high-speed bearing test, known as MIL-G-3278 (Fed. Std. 791—Test Method No. 331). In the test, a ball bearing packed with a grease is operated at 10,000 r.p.m. continuously for approximately 22 hours at 350° F. The apparatus is then cooled to room temperature during a period of two hours. This procedure of operation at 10,000 r.p.m. at 350° F. and cooling is repeated until there is bearing failure.

The roll test was run by placing 75 grams of grease in a roll-test apparatus which is described in military specification test MIL-G-10924. However, whereas the MIL-G-10924 test specifies 10 r.p.m. for the apparatus, the data herein were obtained with the apparatus operating at 175 r.p.m. Any grease remaining as a grease for a period of at least four hours in this test is considered to have an excellent stability.

For the work stability test data, ASTM worked penetrations (after 60 strokes in the ASTM worker at 77° F.) were obtained on the grease to be tested. The grease was then packed into a No. 206 shielded ball bearing. The packed bearing was rotated at 3,450 r.p.m. for 30 minutes at room temperature. The ASTM penetration value of the grease at 77° F. was then obtained. The ΔP of Table II represents the changes in the ASTM worked penetration values obtained before the grease was packed into the bearing, and the ASTM penetration values obtained after the bearing had been rotated.

In addition to the base oils, the metal benzoates and the metal terephthalamates described herein, the grease compositions of this invention may also include stringiness agents, oxidation inhibitors, antiwear agents, peptizing agents, fillers, antithixotropic agents, etc.

Table I

| Composition, Percent By Weight | Grease Number | | | | | | |
|---|---|---|---|---|---|---|---|
| | 1 | 2 | 3 | 4 | 5 | 6 | 7 |
| Na N-octadecyl terephthalamate | 6.0 | 11.8 | 6 | 6 | 6 | 6 | 6 |
| Na Benzoate | | | | | | 17 | 17 |
| Ba Benzoate | | | | | | | |
| Na p-toluate | | | 20.5 | | | | |
| Na p-chlorobenzoate | | | | 24 | | | |
| Na Salicylate | | | | | 22 | | |
| Mol Ratio [1] | | | 10 | 10 | 10 | 10 | 10 |
| Base Oil "A" | 94.0 | 88.2 | 73.5 | 70 | 72 | 77 (1% Glycerol) | 76+ |
| Base Oil "B" | | | | | | | |
| Base Oil "C" | | | | | | | |

[1] Mol Ratio—aromatic acid salt terephthalamic acid salt.

Table II

| Composition, Percent By weight | Grease Number | | | | | | |
|---|---|---|---|---|---|---|---|
| | 8 | 9 | 10 | 11 | 12 | 13 | 14 |
| Na N-octadecyl-terephthalamate | 11.5 | 9.4 | 10.1 | 11.5 | 15 | 10 | [1] 12 |
| Na Benzoate | 3.5 | 2.8 | | 3.5 | | | |
| Ba Benzoate | | | 4.9 | | | | |
| Na p-toluate | | | | | | | |
| Na p-chlorobenzoate | | | | | | | |
| Na Salicylate | | | | | | | |
| Mol Ratio-Benzoate/Na X-10 | 1 | 1 | 1 | 1 | | | 1 |
| Base Oil "A" | | | | | | | |
| Base Oil "B" | | | | 85 | 85 | | |
| Base Oil "C" | 85 | 87.8 | 85 | | | 90 | 88 |

[1] 12% by weight of the combined Na N-octadecylterephthalamate and Na Benzoate.

Table III

| Test | Grease Number | | | | | | |
|---|---|---|---|---|---|---|---|
| | 1 | 2 | 3 | 4 | 5 | 6 | 7 |
| ASTM Dropping Pt., °F | 225 | 524 | 580+ | 580+ | 470 | 580+ | 580+ |
| $P_{60}$ | 426 | 227 | 319 | 326 | 328 | 271 | 203 |
| Falex E. P. Test (Steel on Steel) Pounds | [1] 1,775 | [1] 1,450 | [1] 1,975 | [1] 4,375 | [1] 3,975 | [2] 2,000 | [2] 2,030 |

[1] Average of 2 runs.
[2] Average of 3 runs.

Table IV

| Test | Grease Number | | | | | | |
|---|---|---|---|---|---|---|---|
| | 8 | 9 | 10 | 11 | 12 | 13 | 14 |
| ASTM Dropping Pt., °F | 500+ | 500+ | 331 | 580+ | 580+ | 500+ | 500+ |
| $P_{60}$ | 241 | 278 | 372 | 229 | 199 | 273 | 278 |
| Bearing Life (Hours) (350° F.) | | | | 348 (av. 3 runs) | 319 (av. 3 runs) | | |
| Stability Test (HP) | −29 | | | −3 | | | |
| Boiling Water Life, Min | 60+ | | | 60+ | | | |
| Roll Test (Hours to Liquid) | | | 1,100+ | | | | |
| Falex E. P. Test (Steel on Steel) Pounds | | | | | | | |
| Falex Steel on Steel Wear (mgms.) (500 lbs. pressure—30 minutes) | | | | | | [1] 3.75 | [1] 1.1 |
| Loaded Wheel Bearing (Retention Percent): | | | | | | | |
| Unheated | | | | | | 46 | 68 |
| At 250° F | | | | | | 43 | 71 |

[1] Average of 2 runs.

I claim:

1. A grease composition comprising a major proportion of an oil of lubricating viscosity and, in combination, a metal salt of N-alkyl terephthalamic acid containing from 4 to 22 carbon atoms in the alkyl radical and a metal salt of a mononuclear aromatic monocarboxylic acid, wherein the mole ratio of said metal salt of aromatic monocarboxylic acid to said metal salt of terephthalamic acid has a value from 0.1 to 20, and wherein said metal salt of terephthalamic salt is present in an amount sufficient to thicken said oil to the consistency of a grease, wherein the metal in each instance is a metal selected from the group consisting of the metals of Groups I and II of Mendelyeev's Periodic Table.

2. A grease composition comprising a major proportion of an oil of lubricating viscosity, from 5% to 50% by weight of a metal salt of N-alkyl terephthalamic acid containing from 4 to 22 carbon atoms in the alkyl radical, and in combination therewith, a metal salt of a mononuclear aromatic monocarboxylic acid, wherein the mole ratio of said metal salt of aromatic monocarboxylic acid to said metal salt of terephthalamic acid has a value from 1 to 20, wherein the metal in each instance is a metal selected from the group consisting of the metals of Groups I and II of Mendelyeev's Periodic Table.

3. A grease composition comprising a major proportion of an oil of lubricating viscosity, from 7% to 30% by weight of a metal salt of N-alkyl terephthalamic acid containing from 4 to 22 carbon atoms in the alkyl radical, and in combination therewith, a metal salt of a mononuclear aromatic monocarboxylic acid, wherein the mole ratio of said metal salt of aromatic monocarboxylic acid to said metal salt of terephthalamic acid has a value from 1 to 20, wherein the metal in each instance is a metal selected from the group consisting of the metals of Groups I and II of Mendelyeev's Periodic Table.

4. A grease composition comprising a major proportion of an oil of lubricating viscosity, from 5% to 50% by weight of a metal salt of N-alkyl terephthalamic acid containing from 4 to 22 carbon atoms in the alkyl radical and from 1% to 30% by weight of a metal salt of mononuclear aromatic monocarboxylic acid, wherein the mole ratio of said metal salt of aromatic monocarboxylic acid to said metal salt of terephthalamic acid has a value from 1 to 10, wherein the metal in each instance is a metal selected from the group consisting of the metals of Groups I and II of Mendelyeev's Periodic Table.

5. A grease composition comprising a major proportion of an oil of lubricating viscosity, from 7% to 30% by weight of a metal salt of N-alkyl terephthalamic acid containing from 4 to 22 carbon atoms in the alkyl radical, and from 5% to 25% by weight of a metal salt of mononuclear aromatic monocarboxylic acid, wherein the mole ratio of said metal salt of aromatic monocarboxylic acid to said metal salt of terephthalamic acid has a value from 1 to 10, wherein the metal in each instance is a metal selected from the group consisting of the metals of Groups I and II of Mendelyeev's Periodic Table.

6. A grease composition comprising a major proportion of an oil of lubricating viscosity, from 5% to 50% by weight of a metal salt of N-alkyl terephthalamic acid, and from 5% to 25% by weight of a metal salt of a mononuclear aromatic monocarboxylic acid, wherein the mole ratio of said metal salt of aromatic monocarboxylic acid to said metal salt of terephthalamic acid has a value from 0.1 to 20, and wherein said alkyl radical of said terephthalamic acid contains from 1 to 22 carbon atoms, wherein the metal in each instance is a metal selected from the group consisting of the metals of Groups I and II of Mendelyeev's Periodic Table.

7. A grease composition comprising a major proportion of an oil of lubricating viscosity, from 5% to 50% by weight of a metal salt of N-alkyl terephthalamic acid, and from 5% to 25% by weight of a metal salt of a mononuclear aromatic monocarboxylic acid, wherein the mole ratio of said metal salt of aromatic monocarboxylic acid to said metal salt of terephthalamic acid has a value from 0.1 to 20, and wherein said alkyl radical of said terephthalamic acid contains from 4 to 22 carbon atoms, wherein the metal in each instance is a metal selected from the group consisting of the metals of Groups I and II of Mendelyeev's Periodic Table.

8. A grease composition comprising a major portion of an oil of lubricating viscosity, from 5% to 50% of a metal salt of N-alkyl terephthalamic acid wherein said metal is selected from the group consisting of the metals of Groups I and II of Mendelyeev's Periodic Table and said alkyl radical contains from 1 to 22 carbon atoms, and from 1% to 30% by weight of a metal salt of a mononuclear aromatic monocarboxylic acid, wherein the mole ratio of said metal salt of aromatic monocarboxylic acid to said metal salt of terephthalamic acid has a value from 0.1 to 20 wherein said metal of the aromatic monocarboxylic acid is a metal selected from the group consisting of the metals of Groups I and II of Mendelyeev's Periodic Table.

9. A grease composition comprising a major proportion of an oil of lubricating viscosity, from about 7% to 30% by weight of an alkali metal salt of N-alkyl terephthalamic acid wherein said alkyl radical contains from 4 to 22 carbon atoms, and from 1% to 30% by weight of an alkali metal salt of a monouclear aromatic monocarboxylic acid, wherein the mole ratio of said metal salt of aromatic monocarboxylic acid to said metal salt of terephthalamic acid has a value from 0.1 to 10.

10. A grease composition comprising a major proportion of an oil of lubricating viscosity, from about 7% to 30% by weight of an alkaline earth metal salt of N-alkyl terephthalamic acid wherein said alkyl radical contains from 4 to 22 carbon atoms, and from 1% to 30% by weight of an alkali metal salt of a mononuclear aromatic monocarboxylic acid wherein the mole ratio of said metal salt of aromatic monocarboxylic acid to said metal salt of terephthalamic acid has a value from 0.1 to 10.

11. A grease composition comprising a major proportion of an oil of lubricating viscosity, from 7% to 30% by weight of an alkali metal salt of N-alkyl terephthalamic acid wherein said alkyl radical contains from 4 to 22 carbon atoms, and from 1% to 30% by weight of a metal salt of benzoic acid wherein the metal of said metal salt of benzoic acid is a metal selected from the group consisting of the metals of Groups I and II of Mendelyeev's Periodic Table, and, wherein the mole ratio of said metal salt of aromatic monocarboxylic acid to said metal salt of terephthalamic acid has a value from 0.1 to 20.

12. A grease composition comprising a major proportion of an oil of lubricating viscosity, from 7% to 30% by weight of an alkali metal salt of N-alkyl terephthalamic acid wherein said alkyl radical contains from 4 to 22 carbon atoms, and from 1% to 30% by weight of a metal salt of benzoic acid wherein the metal of said metal salt of benzoic acid is a metal selected from the group consisting of the metals of Groups I and II of Mendelyeev's Periodic Table, and, wherein the mole ratio of said metal salt of aromatic monocarboxylic acid to said metal salt of terephthalamic acid has a value from 0.1 to 10.

13. A grease composition comprising a major proporportion of an oil of lubricating viscosity, from 7% to 30% by weight of an alkali metal salt of N-alkyl terephthalamic acid wherein said alkyl radical contains from 4 to 22 carbon atoms, and from 5% to 25% by weight of an alkali metal salt of benzoic acid, wherein the mole ratio of said metal salt of aromatic monocarboxylic acid to said metal salt of terephthalamic acid has a value from 0.1 to 20.

14. A grease composition comprising a major proporportion of an oil of lubricating viscosity, from 7% to 30% by weight of a sodium salt of N-alkyl terephthalamic acid wherein said alkyl radical contains from 4 to 22 carbon atoms, and from 1% to 30% by weight of a sodium salt of benzoic acid, wherein the mole ratio of said salt of aromatic monocarboxylic acid to said salt of terephthalamic acid has a value from 0.1 to 10.

15. A grease composition comprising at least 50% by weight of a lubricating oil, and in an amount sufficient to thicken said oil to the consistency of a grease, a metal salt of terephthalamic acid of the formula

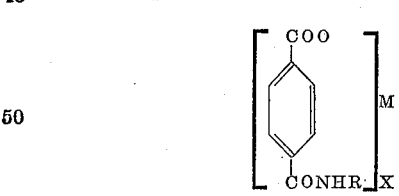

wherein R is a hydrocarbon radical containing from 4 to 22 carbon atoms, M is a metal selected from the group consisting of alkali metals and alkaline earth metals, and from 1% to 30% by weight of a metal salt of a mononuclear aromatic monocarboxylic acid of the formula

wherein R is selected from the group consisting of hydrogen and an aliphatic radical containing from 1 to 8 carbon atoms, and M is a metal selected from the group consisting of the metals of Group I of Mendelyeev's Periodic Table, wherein the mole ratio of said metal salt of said monocarboxylic acid to said metal salt of terephthalamic acid has a value from 0.1 to 20.

16. A grease composition comprising at least 50% by weight of a lubricating oil, and in an amount sufficient to thicken said oil to the consistency of a grease, a metal salt of terephthalamic acid of the formula

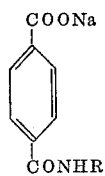

wherein R is a hydrocarbon radical containing from 4 to 22 carbon atoms, and from 1% to 30% by weight of a metal salt of a mononuclear aromatic monocarboxylic acid of the formula

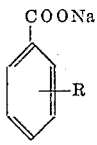

wherein R is selected from the group consisting of hydrogen and an aliphatic radical containing from 1 to 8 carbon atoms, wherein the mole ratio of said metal salt of said monocarboxylic acid to said metal salt of terephthalamic acid has a value from 0.1 to 20.

17. A grease composition comprising at least 50% by weight of a petroleum lubricating oil, from 7% to 30% by weight of sodium N-octadecyl terephthalamate, and from 5% to 25% by weight of sodium benzoate, wherein the mole ratio of said sodium benzoate to said sodium terephthalamate has a value from 1 to 10.

18. A grease composition comprising at least 50% by weight of a petroleum lubricating oil, from 7% to 30% by weight of sodium N-octadecyl terephthalamate, and from 5% to 25% by weight of barium benzoate, wherein the mole ratio of said barium benzoate to said sodium terephthalamate has a value from 0.1 to 20.

19. A grease composition comprising at least 50% by weight of a petroleum lubricating oil, from 7% to 30% by weight of sodium N-octadecyl terephthalamate, and from 5% to 25% by weight of sodium p-toluate, wherein the mole ratio of said sodium toluate to said sodium terephthalamate has a value from 0.1 to 20.

References Cited in the file of this patent
UNITED STATES PATENTS 2,182,137    Ricketts _____ Dec. 5, 1939
2,820,012    Hotten _____ Jan. 14, 1958

UNITED STATES PATENT OFFICE

CERTIFICATE OF CORRECTION

Patent No. 2,956,022                                October 11, 1960

Bruce W. Hotten

It is hereby certified that error appears in the printed specification of the above numbered patent requiring correction and that the said Letters Patent should read as corrected below.

Column 5, line 30, for "compostiions" read -- compositions --; column 7, Table IV, first column thereof, under the heading "Test", fourth line, for "(HP)" read -- ($\Delta$P) --; column 9, line 61, for "monouclear" read -- mononuclear --.

Signed and sealed this 11th day of April 1961.

(SEAL)
Attest:

ERNEST W. SWIDER
Attesting Officer

ARTHUR W. CROCKER
Acting Commissioner of Patents